United States Patent
Brown et al.

(10) Patent No.: US 12,480,832 B2
(45) Date of Patent: Nov. 25, 2025

(54) VACUUM-BASED LEAK DETECTION

(71) Applicant: Robert Bosch GmbH, Stuttgart (DE)

(72) Inventors: William Brown, Owatonna, MN (US); Chad Samp, Albert Lea, MN (US)

(73) Assignee: Robert Bosch GmbH, Stuttgart (DE)

( * ) Notice: Subject to any disclaimer, the term of this patent is extended or adjusted under 35 U.S.C. 154(b) by 381 days.

(21) Appl. No.: 17/964,232

(22) Filed: Oct. 12, 2022

(65) Prior Publication Data
US 2023/0139875 A1 May 4, 2023

Related U.S. Application Data

(60) Provisional application No. 63/273,420, filed on Oct. 29, 2021.

(51) Int. Cl.
*G01M 3/26* (2006.01)
*G01M 3/32* (2006.01)
*G01M 3/36* (2006.01)

(52) U.S. Cl.
CPC ............... *G01M 3/26* (2013.01); *G01M 3/32* (2013.01); *G01M 3/36* (2013.01)

(58) Field of Classification Search
None
See application file for complete search history.

(56) References Cited

U.S. PATENT DOCUMENTS

| | | | | |
|---|---|---|---|---|
| 4,534,208 A * | 8/1985 | Macin | ..................... | G01M 3/10 455/226.1 |
| 5,363,689 A | 11/1994 | Hoffmann et al. | | |
| 5,411,004 A * | 5/1995 | Busato | ............... | F02M 25/0818 123/198 D |
| 2013/0291624 A1* | 11/2013 | Yaberg | .................... | G01M 3/34 73/40 |
| 2014/0277927 A1* | 9/2014 | Guo | ................... | F02M 25/0818 701/34.4 |
| 2022/0410717 A1* | 12/2022 | Parker | ..................... | B60L 58/10 |

FOREIGN PATENT DOCUMENTS

| | | | | |
|---|---|---|---|---|
| EP | 0351061 | | 1/1990 | |
| EP | 3239682 B1 | * | 8/2020 | ............. G01L 9/007 |
| KR | 20040025844 A | * | 3/2004 | |

OTHER PUBLICATIONS

Redline Detection, "Cap Plug Kit", Accessed via Wayback Machine (Relied on publication date Aug. 6, 2020). Accessed by examiner on Apr. 10, 2025. https://web.archive.org/web/20201029185051/https://redlinedetection.com/products/cap-plug-kit.*

* cited by examiner

*Primary Examiner* — Herbert K Roberts
(74) *Attorney, Agent, or Firm* — David Kovacek; Maginot, Moore & Beck LLP

(57) ABSTRACT

A system and method for detecting leaks in an enclosure having a port and intended to prevent liquid material from exchanging into or out of the enclosure. A vacuum pump is coupled to the port and the enclosure is subjected to an applied vacuum pressure. Measurements of the mass and pressure within the enclosure while subject to the applied vacuum pressure are compared to expected values to detect a leak. In some embodiments, the physical arrangement of a valve of the enclosure is measured and compared to expected values to detect a leak.

18 Claims, 6 Drawing Sheets

VACUUM-BASED LEAK DETECTION

TECHNICAL FIELD

This disclosure relates to leak detection in enclosures. In particular, this disclosure is related to leak detection for enclosures used in automobiles.

BACKGROUND

Automobile components may comprise a number of enclosures or components that provide a degree of protection from the outside elements during operation of the automobile. Such enclosures or components may require leak-proof functionality, for proper operation. For example, an electric vehicle comprises a battery that may be disposed within an enclosure to protect it from exposure to liquid, such as rain or water within a driving environment. In another example, a fuel tank (suitable for liquid fuels, such as gasoline or diesel) may be sealed prevent contamination of the fuel or a reduction in pressure within the fuel delivery to the motor.

Such components often utilize seals to prevent leakage into or out of the enclosure. These seals may be handled or removed from the enclosure during normal service functions. Upon completion of the service function, testing of the enclosure for leaks in the seals may be necessary to ensure proper functionality of the enclosure during normal operation. Conventional testing methods may rely upon complicated and time-consuming procedures, reducing the overall efficiency of a technician or a shop performing service to the enclosure. It would therefore be desirable for testing procedures to be made less complicated and less time consuming.

SUMMARY

One aspect of this disclosure is directed to a method of leak detection for an enclosure having a seal, an internal chamber, and a port in fluid communication with the internal chamber. The method comprises applying a vacuum pump to the port, activating the vacuum pump to apply a predetermined fixed vacuum pressure to the internal chamber, generating mass exchange rate data with a mass airflow sensor indicating a rate of mass exchange within the closure, and outputting an indication signal. The indication signal may comprise a leak indication signal indicating at least one leak in the seal is present if the rate of mass exchange is greater than an expected threshold value. The indication signal may otherwise comprise a seal indication signal indicating that no leak has been detected. In some embodiments of enclosures having multiple ports, all but one port may be sealed prior to applying the vacuum pump to the remaining port.

Another aspect of this disclosure is directed to a method of leak detection for an enclosure having a seal, an internal chamber, a valve, and a port in fluid communication with the internal chamber. The method comprises applying a vacuum pump to the port, activating the vacuum pump to apply a predetermined fixed vacuum pressure to the internal chamber, measuring the displacement of the valve while the vacuum pump is activated, and outputting an indication signal. The indication signal may comprise a leak indication signal indicating at least one leak in the seal is present if the displacement of the valve differs from an expected displacement value by an amount greater than an expected threshold displacement value. The indication signal may otherwise comprise a seal indication signal indicating that no leak has been detected. In some embodiments of enclosures having multiple ports, all but one port may be sealed prior to applying the vacuum pump to the remaining port.

A further aspect of this disclosure is directed to a method of leak detection for an enclosure having, a seal, an internal chamber, and a port in fluid communication with the internal chamber. The method comprises applying a vacuum pump to the port, activating the vacuum pump to apply a predetermined fixed vacuum pressure to the internal chamber, generating mass exchange rate data with a mass airflow sensor indicating a rate of mass exchange within the closure, increasing the pressure applied by the vacuum pump after activation until the mass airflow sensor indicates a predetermined pressure value, measuring the applied pressure of the vacuum pump when the mass airflow sensor indicates the predetermined pressure value, and outputting an indication signal. The indication signal may comprise a leak indication signal indicating at least one leak in the seal is present when the time required to achieve the internal pressure is greater than an expected threshold time value or the applied pressure is greater than an expected threshold pump pressure value. The indication signal may otherwise comprise a seal indication signal indicating that no leak has been detected. In some embodiments of enclosures having multiple ports, all but one port may be sealed prior to applying the vacuum pump to the remaining pump.

A yet further aspect of this disclosure is directed to a system for leak detection of an enclosure, the system utilizing a vacuum pump and a mass airflow sensor configured to measure vacuum pressure applied to the enclosure while the vacuum pump is activated. The vacuum pump may be coupled to the enclosure using a vacuum tube configured to detachably couple to a port of the enclosure. The system may further comprise a controller and memory operable to collate data generated by the mass airflow sensor, and generate data indicating the voltage applied to power the vacuum pump, or make time measurements.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
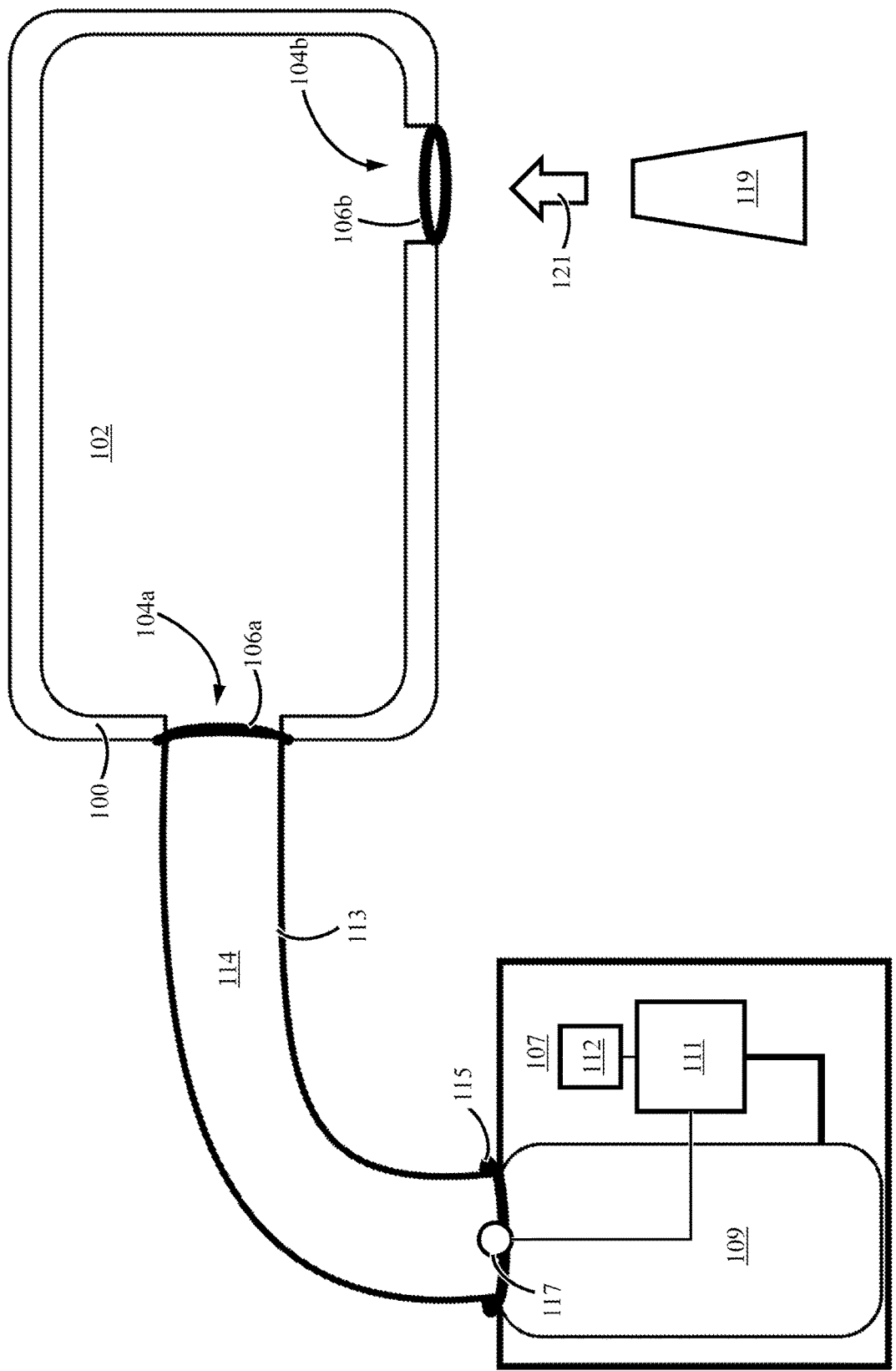
FIG. 1 is a diagrammatic illustration of an enclosure leak-detection system.

FIG. 1 is a diagrammatic illustration of a leak detection system configured for use with an enclosure 100. Enclosure 100 may be configured to permit a degree of gaseous exchange but may not be suitable to permit exchange of liquids. In the depicted embodiment, enclosure 100 may comprise an enclosure suitable to house the battery of an electric vehicle. In such an embodiment, enclosure 100 may be configured to prevent exchange of liquid material into an internal chamber 102 of enclosure 100 from outside the enclosure. In such an embodiment, enclosure 100 may exhibit a degree of weatherproofing, preventing outside liquids such as rain, mud, puddles, or other environmental hazards from entering internal chamber 102 and potentially causing failures. A similar embodiment may be realized for other enclosures where the exchange of liquids from the outside is undesirable, such as fuel containers.

In the depicted embodiment, enclosure 100 comprises a number of ports 104 that provide fluid communication with internal chamber 102. During normal operation, each of the ports 104 may provide necessary fluid communication to other components of the automobile. Each port may utilize a corresponding seal 106 to prevent leakage into or out of internal chamber 102. In the depicted embodiment, ports 104a and 104b have similar dimensions, as do seals 106a and 106b respectively, but other embodiments may comprise any arbitrary number of ports 104, each having an arbitrary configuration that operates with a corresponding seal 106 without deviating from the teachings disclosed herein.

During service, enclosure 100 may require disassembly, including removal of one or more of seals 106. Upon reassembly after service, it is desirable to ensure that each of seals 106 has been properly re-assembled, and that none of seals 106 has been damaged. Improper reassembly or damage to seals 106 may result in an undesired leak. In conventional testing for leaks, a time-intensive leak detection process is frequently utilized. In the depicted embodiment, a leak tester 107 comprising a vacuum pump 109 may provide a faster test results.

Tester 107 comprises a vacuum pump 109. Vacuum pump 109 may comprise an electric pump in the depicted embodiment, but other embodiments may comprise other configurations without deviating from the teachings disclosed herein. Advantageously, the operation of an electric vacuum pump 109 may be controlled electronically via a controller 111. Controller 111 is configured to activate and control the power level supplied to vacuum pump 109, and subsequently additionally configured to activate and control the pressure applied to any chamber in fluid communication with vacuum pump 109. In the depicted embodiment, tester 107 further comprises a memory 112 that may provide executable instructions for controller 111 to execute, or may store data generated by other components of tester 107. In the depicted embodiment, vacuum pump 109 is coupled with fluid communication to internal chamber 102 via a vacuum tube 113. Vacuum tube 113 provides fluid communication between vacuum pump 109 and internal chamber 102 by detachably coupling to a port, such as port 104a. Vacuum tube 113 defines a tube conduit 114 that enables fluid communication through the length of vacuum tube 113. In the depicted embodiment, tester 107 comprises a tester seal 115 to ensure a proper pressure gradient can be achieved, but other embodiments may comprise a different configuration not having a distinct seal from vacuum tube 113 or vacuum pump 109 without deviating from the teachings disclosed herein.

Disposed within tube conduit 114 is a sensor 117. In the depicted embodiment, sensor 117 comprises a mass airflow sensor configured to generate data indicating pressure within tube conduit 114, the rate of exchange of gaseous matter through tube conduit 114, or other data indicating mass or pressure conditions within tube conduit 114. Controller 111 may comprise a clock component operable to generate time-based data in conjunction with the data generated by sensor 117.

In the depicted embodiment, enclosure 100 comprises a second port 104b that must be sealed prior to the testing operation in order to ensure an accurate reading of pressure within internal chamber 102. In such embodiments, the system may utilize a stopper 119 inserted into port 104b along direction 121. The dimensions and composition of stopper 119 may be defined in order to ensure compatibility with the particular dimensions and operability of port 104b when pressure is applied. In the depicted embodiment, stopper 119 may comprise a conic section composed of a rubber polymer that forms an airtight seal with seal 106b, but other embodiments may comprise other configurations without deviating from the teachings disclosed herein. In other embodiments having different or additional ports 104, a plurality of stoppers 119 having different configurations may be utilized to accommodate the specifications of the respective ports in those embodiments without deviating from the teachings disclosed herein.

In the depicted embodiment, once vacuum tube 113 has been coupled to port 104a and port 104b has been effectively sealed using stopper 119, pressure may be applied to internal chamber 102 by activating vacuum pump 109. In the depicted embodiment, the pressure applied by vacuum pump 109 is electrically controlled by controller 111: larger voltages applied by controller 111 to vacuum pump 109 correspond to higher pressure gradients generated by vacuum pump 109. While pressure is applied, mass airflow sensor 117 generates pressure data indicating pressure within the space defined by internal chamber 102 and tube conduit 114. The pressure date may additionally indicate the rate of mass exchange as atmosphere is removed from internal chamber 102.

Once pressure data is generated, controller 111 may compare the pressure data to expected values of pressure or rate of mass exchange. If the pressure within the internal chamber 102 is found to be outside of the expected values by a degree larger than a specified threshold, controller 111 may generate a leak indication signal indicating that a leak has been detected within enclosure 100. If the rate of mass exchange deviates from an expected value by a degree that has a magnitude larger than a specified expected threshold rate value, controller 111 may generate the leak indication signal. If the pressure and rate of mass exchange are found to be within specified expected values, controller 111 may generate a seal indication signal indicating that no leak has been detected. Controller 111 may output the respective generated signal to a human-user interface (not depicted) to alert a user whether a leak has been detected or a leak has not been detected. The human-user interface may comprise a visual indicator, audible indicator, display screen, or any other feedback element recognized by one of ordinary skill without deviating from the teachings disclosed herein. Such a human-user interface may comprise input element to permit a user to interact with controller 111, such as a touchscreen, keyboard, dipswitch, or any other element for electronic input recognized by one of ordinary skill without deviating from the teachings disclosed herein. In the depicted embodiment, the human-user interface may comprise a touchscreen display, light-based visual indicators, and an audio speaker, but other embodiments may comprise other configurations without deviating from the teachings disclosed herein.

During the testing operation, it may take a brief period of time for the internal chamber 102 to achieve the desired pressure, even under nominal operating circumstances. Controller 111 may delay generation of an indication signal until a sufficient time has elapsed that the measurements of mass airflow sensor 117 would be considered valid under normal conditions. For example, an indication signal may not be generated until a predetermined number of measurements have been acquired by the mass airflow sensor 117, or until the measurements have be consistent for a designated period of time. Advantageously, utilization of the mass exchange rate data may be considered almost immediately upon activation of vacuum pump 109, yielding a faster response to generate an indication signal.

Other data derived from the measurements of mass airflow sensor 117 may be utilized to detect a leak. In some embodiments, the amount of time that passes to achieve an expected pressure within internal chamber 102 may be compared to an expected time value, and if the measured time deviates from the expected value beyond an expected threshold time value, a leak may be indicated. In some embodiments, the amount of pressure applied by the vacuum pump 109 to achieve a desired pressure within internal chamber 102 may be considered. In such embodiments, the applied pressure of vacuum pump 109 corresponds to the voltage applied to vacuum pump 109 by controller 111. In instances wherein the voltage applied deviates from an expected voltage, the applied pressure being generated by vacuum pump 109 is understood to be different than what is observed within internal chamber 102. If the applied pressure of the vacuum pump 109 deviates from an expected pump pressure value beyond a threshold pump pressure value, controller 111 may indicate a leak.

The specified expected values of pressure, applied pressure, applied voltage, or mass exchange rate are expected to be correlated to the particular configuration of enclosure 100. These expected values may be different for different configurations of enclosure 100, and the different expected values may be stored in memory 112, such as in a lookup table accessible by controller 111. In embodiments where these deviations are accessible by controller 111, tester 107 advantageously remains functional across all specified enclosure configurations. In the depicted embodiment, different data for new enclosure configurations may be input by a user utilizing the human-machine interface (not shown), and stored in memory 112. Already-stored configurations of enclosures 100 may be utilized by referencing the particular expected values in memory 112 prior to the testing operation, increasing the speed and flexibility of testing using tester 107.

Figure 2:
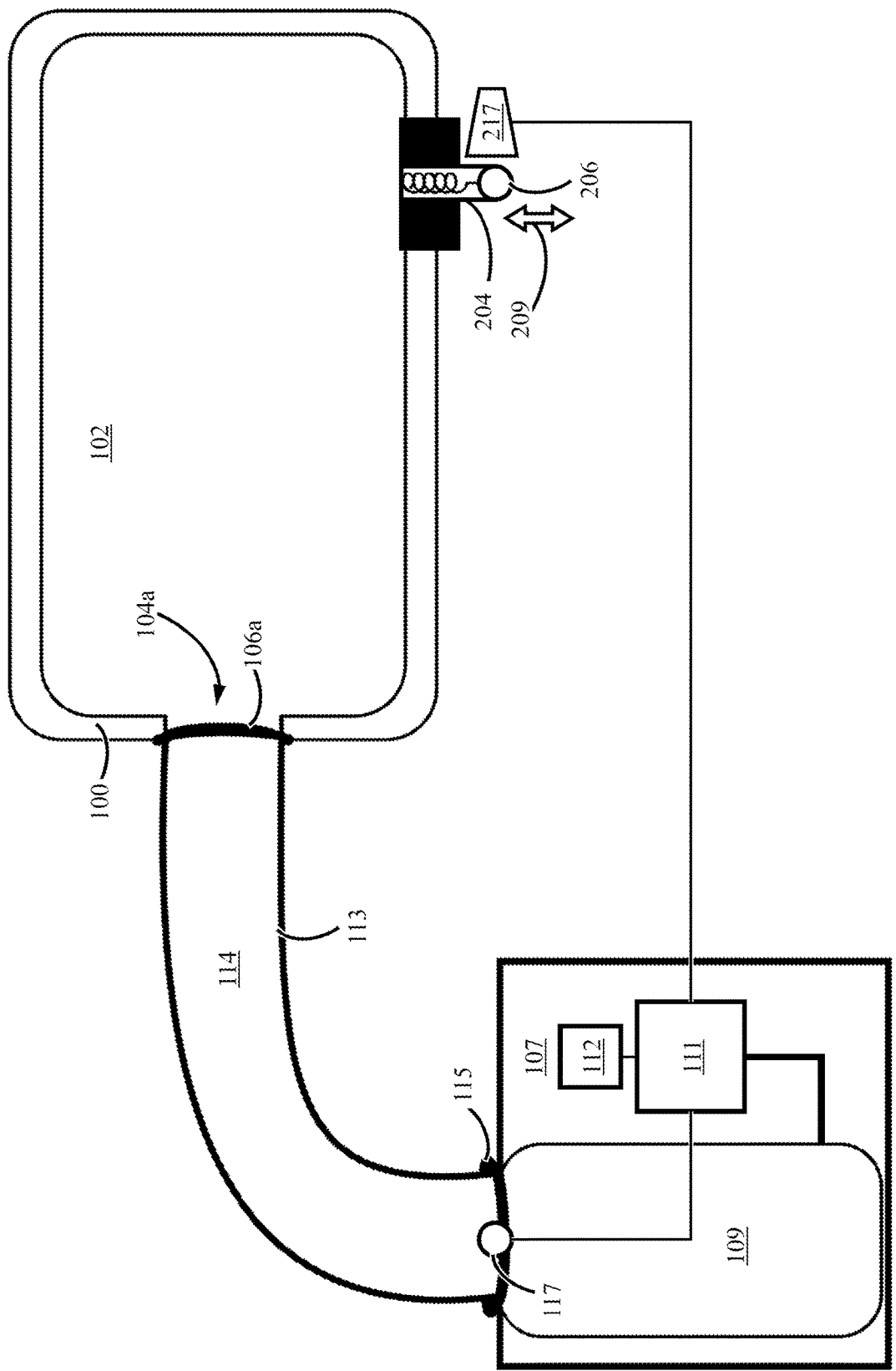
FIG. 2 is a diagrammatic illustration of an enclosure leak-detection system for an enclosure having a valve.

Tester 107 may be configured to utilize other methods for leak detection. FIG. 2 depicts tester 107 in use with an embodiment of enclosure 100 wherein port 104b (see FIG. 1) is sealed by a valve 204. In such an embodiment, sealing of valve 204 may not be accomplished with an external stopper such as stopper 119, and instead the valve itself may be self-sealing when pressure is applied. Alternately, the calculations of expected values of pressure, applied pressure, applied voltage, or mass exchange rate may be adapted to accommodate the presence of valve 204.

In the depicted embodiment, the physical condition of valve 204 may be monitored during application of pressure by vacuum pump 109 for expected conditions thereof. By way of example, and not limitation, valve 204 may comprise a solenoid valve having a valve seal 206 that is spring-loaded and operable for a degree of motion along an axis 209. When a vacuum pressure is applied to internal chamber 102, valve seal 206 may become displaced along axis 209 to a degree correlated to the magnitude of applied pressure. If this displacement deviates from an expected displacement, then a leak may be indicated. If a leak is indicated, controller 111 may generate a leak indication signal for output to a user of tester 107.

In the depicted embodiment, tester 107 further comprises a displacement sensor 217 operable to measure the position of valve seal 206. Displacement sensor 217 is further in data communication with controller 111 to report the measurements as displacement data. Multiple such measurements may additionally be controller 111 to generate data describing the rate of change in the displacement of valve seal 206. In the depicted embodiment, displacement sensor 217 may comprise an optical sensor, but other embodiments may comprise different types of sensors without deviating from the teachings disclosed herein. In some embodiments, a user may measure the displacement of valve seal 206 manually and provide the displacement to controller 111 via the human-machine interface (not shown) without deviating from the teachings disclosed herein.

For a known configuration of enclosure 100 having one or more valves 204, the expected displacement of valve seal 206 for a given pressure, applied pressure, applied voltage, or mass exchange rate may be stored in memory 112 in a lookup table. These expected values may be utilized by tester 107 to determine if the displacement of valve seal 206 deviates from the expected displacement value by an amount greater than an expected threshold displacement value. Different enclosure configurations may correspond to different sets of expected values without deviating from the teachings disclosed herein. different data for new enclosure configurations may be input by a user utilizing the human-machine interface (not shown), and stored in memory 112. Already-stored configurations of enclosures 100 may be utilized by referencing the particular expected values in memory 112 prior to the testing operation, increasing the speed and flexibility of testing using tester 107.

Figure 3:
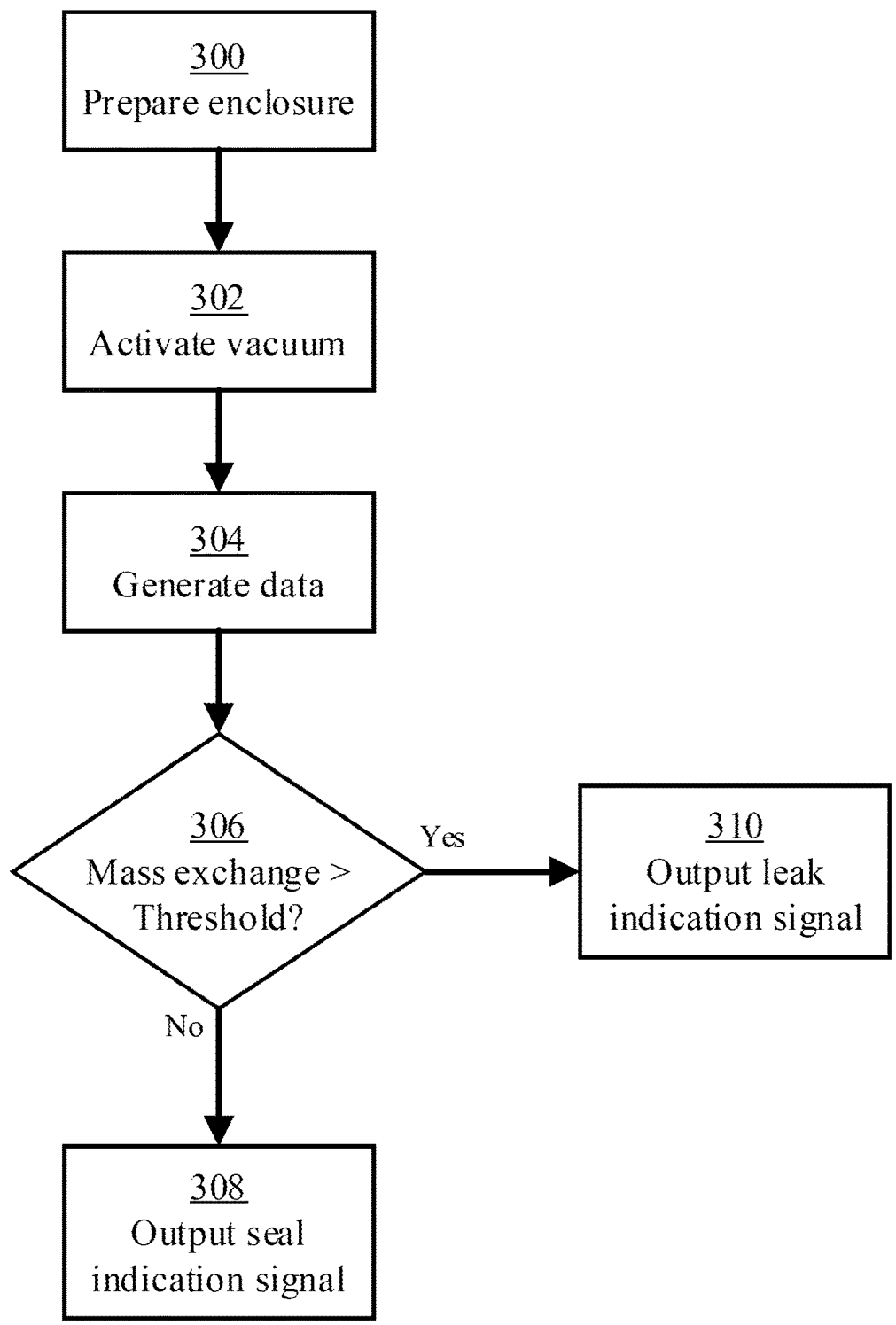
FIG. 3 is a flowchart illustrating a first method of leak detection.

FIG. 3 is a flowchart illustrating a method of leak detection for an enclosure using the teachings disclosed herein. The method beings at step 300, where the enclosure is prepared for a vacuum-based leak detection. Preparation of the enclosure may comprise coupling a vacuum tube to a port of the enclosure, and inserting stoppers into one or more other ports of the enclosure as appropriate for the particular configuration of the enclosure under test. Once the enclosure is properly prepared, the method proceeds to step 302, where a vacuum pump is activated to apply a vacuum pressure to the enclosure. The method then proceeds to step 304 to generate data measuring the conditions of the enclosure under the applied pressure. In this embodiment, the generated data may comprise a measurement of the rate of mass exchange by a mass airflow sensor. After collection of generated data, the method proceeds to step 306 where the generated data is compared to an expected threshold rate value. If the measured exchange rate data is within specified parameters, the method proceeds to step 308 where the method ends with the generation and output of a seal indication signal indicating that a leak was not detected. If the measured exchange rate data deviates from the expected values by an amount greater than a specified threshold value, the method instead proceeds to step 310, where the method ends after the generation and output of a leak indication signal indicating the detection of a leak.

Figure 4:
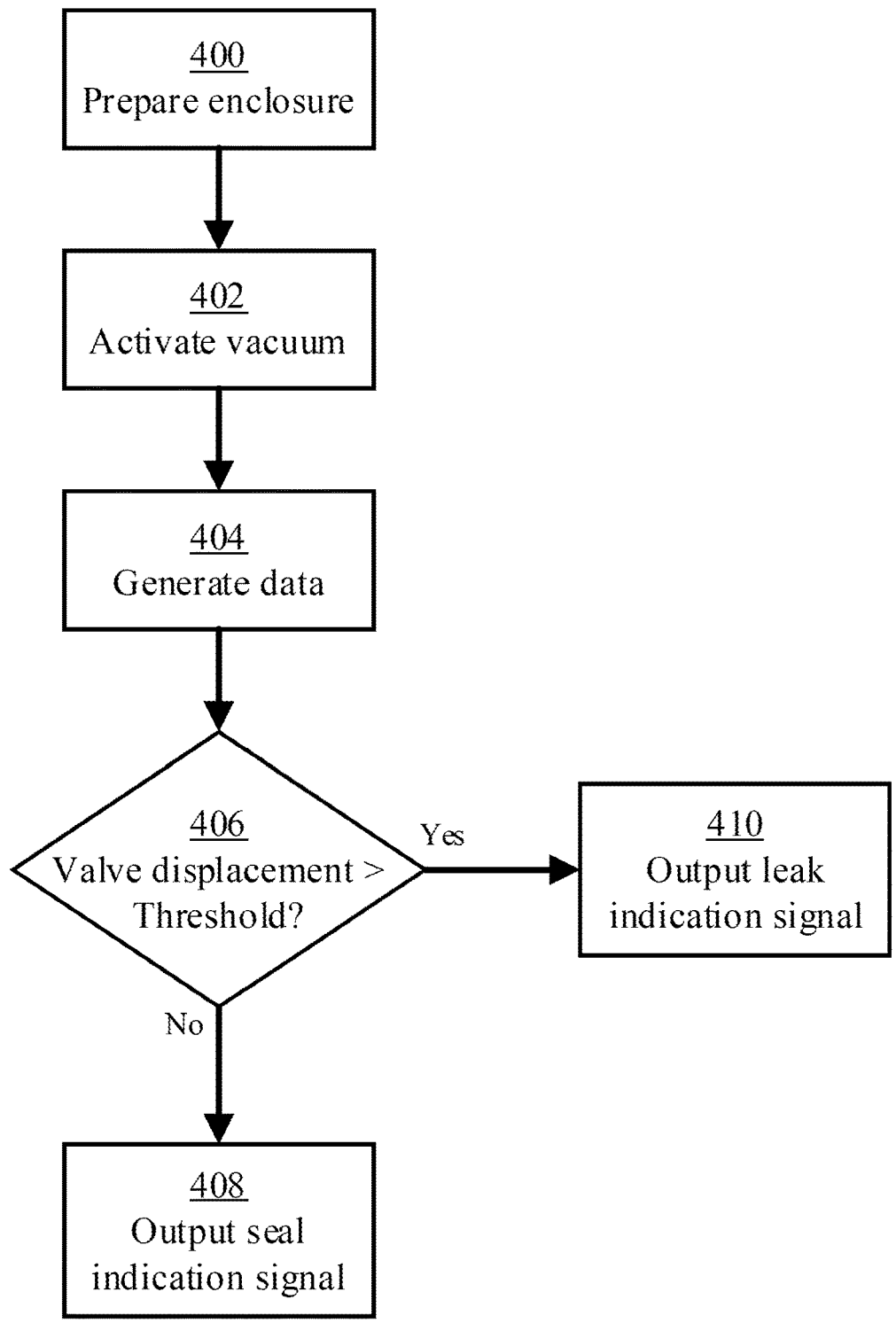
FIG. 4 is a flowchart illustrating a second method of leak detection.

FIG. 4 is a flowchart illustrating a method of leak detection for an enclosure using the teachings disclosed herein. In this embodiment, the subject enclosure is understood to comprise a valve having measurable displacement features (such as valve 204; see FIG. 2). The method beings at step 400, where the enclosure is prepared for a vacuum-based leak detection. Preparation of the enclosure may comprise coupling a vacuum tube to a port of the enclosure, and inserting stoppers into one or more other ports of the enclosure as appropriate for the particular configuration of the enclosure under test. Once the enclosure is properly prepared, the method proceeds to step 402, where a vacuum pump is activated to apply a vacuum pressure to the enclosure. The method then proceeds to step 404 to generate data measuring the conditions of the enclosure under the applied pressure. In this embodiment, the generated data may comprise a measurement of the displacement of a valve of the enclosure while pressure is applied. After collection of generated data, the method proceeds to step 406 where the generated data is compared to an expected displacement value. If the measured displacement data is within specified parameters, the method proceeds to step 408 where the method ends with the generation and output of a seal indication signal indicating that a leak was not detected. If the measured displacement data deviates from the expected values by an amount greater than a specified threshold value, the method instead proceeds to step 410, where the method ends after the generation and output of a leak indication signal indicating the detection of a leak.

Figure 5:
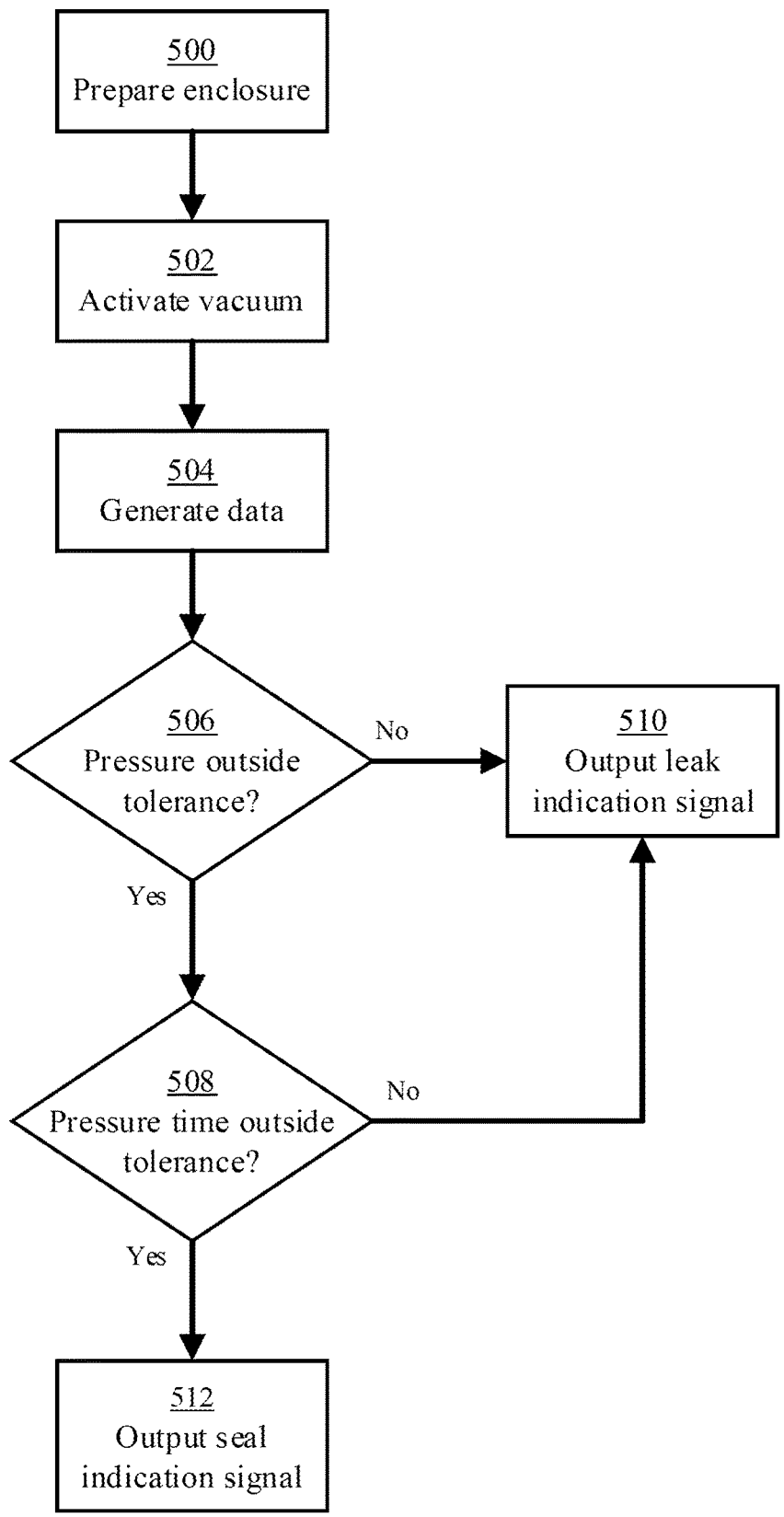
FIG. 5 is a flowchart illustrating a third method of leak detection.

FIG. 5 is a flowchart illustrating a method of leak detection for an enclosure using the teachings disclosed herein. The method beings at step 500, where the enclosure is prepared for a vacuum-based leak detection. Preparation of the enclosure may comprise coupling a vacuum tube to a port of the enclosure, and inserting stoppers into one or more other ports of the enclosure as appropriate for the particular configuration of the enclosure under test. Once the enclosure is properly prepared, the method proceeds to step 502, where a vacuum pump is activated to apply a vacuum pressure to the enclosure. The method then proceeds to step 504 to generate data measuring the conditions of the enclosure under the applied pressure. In this embodiment, the generated data may comprise a measurement of the vacuum pressure within an internal chamber of the enclosure as observed by a mass airflow sensor. The generated data may further comprise a measurement of the amount of time elapsed before the internal chamber achieves an expected pressure as observed by the mass airflow sensor. After collection of generated data, the method proceeds to step 506 where the generated data is compared to an expected threshold pressure value. If the pressure data is within specified parameters, the method proceeds to step 508. If the measured pressure data deviates from the expected values by an amount greater than a specified threshold value, the method instead proceeds to step 510, where the method ends after the generation and output of a leak indication signal indicating the detection of a leak. If the method proceeds to step 508, the measured data is compared to an expected value for the amount of time required to achieve an expected pressure the internal chamber as observed by the mass airflow sensor. If the pressure time deviates from the expected value by an amount greater than a specified time value, the method proceeds to step 510, where the method ends after the generation and output of a leak indication signal indicating the detection of a leak. If the pressure time data is within specified parameters, the method proceeds instead to step 512, where the method ends after generating and outputting a seal indication signal indicating that no leak has been detected. In the depicted embodiment, the actions of step 506 precede those of step 508, but other embodiments may reverse this order or execute the steps concurrently without deviating from the teachings disclosed herein.

Figure 6:
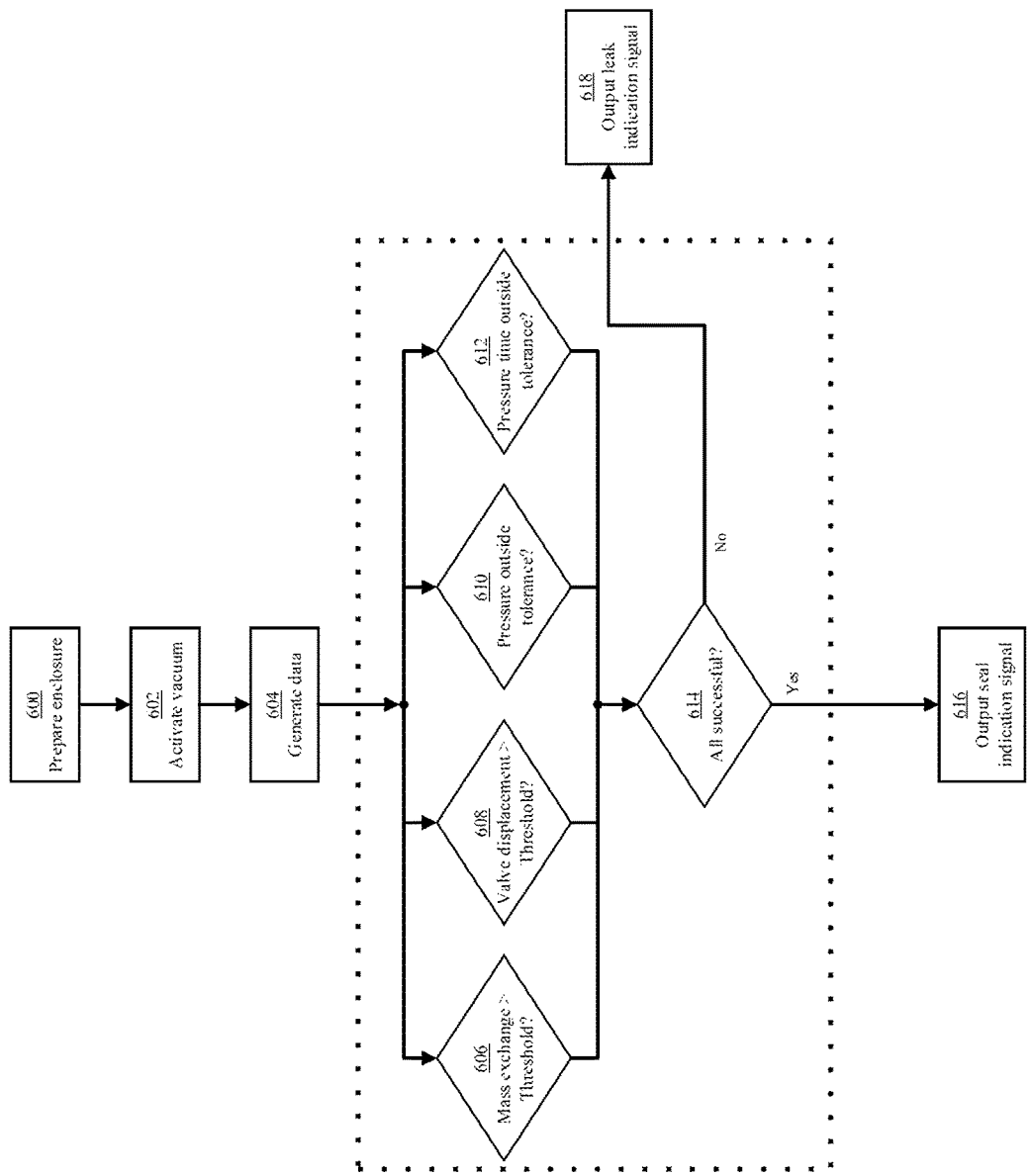
FIG. 6 is a flowchart illustrating a fourth method of leak detection.

In some embodiments, a leak detection method may comprise a combination of comparisons of measured data to detect a leak. FIG. 6 is an illustration of such an embodiment utilizing multiple checks against leaks.

FIG. 6 is a flowchart illustrating a method of leak detection for an enclosure using the teachings disclosed herein. In this embodiment, the subject enclosure is understood to comprise a valve having measurable displacement features (such as valve 204; see FIG. 2). The method beings at step 600, where the enclosure is prepared for a vacuum-based leak detection. Preparation of the enclosure may comprise coupling a vacuum tube to a port of the enclosure, and inserting stoppers into one or more other ports of the enclosure as appropriate for the particular configuration of the enclosure under test. Once the enclosure is properly prepared, the method proceeds to step 602, where a vacuum pump is activated to apply a vacuum pressure to the enclosure. The method then proceeds to step 604 to generate data measuring the conditions of the enclosure under the applied pressure. In this embodiment, the generated data may comprise a measurement of the rate of mass exchange by a mass airflow sensor, a measurement of the displacement of a valve of the enclosure while pressure is applied, a measurement of the vacuum pressure within an internal chamber of the enclosure as observed by a mass airflow sensor, and a measurement of the amount of time elapsed before the internal chamber achieves an expected pressure as observed by the mass airflow sensor. Each of these data may be utilized in a distinct leak detection check, providing a robust leak detection for the enclosure.

After collection of generated data, the method proceeds concurrently to each of steps 606, 608, 610, and 612 where the generated data is compared to one of a number of expected threshold values. At step 606, the measured mass exchange rate is compared to an expected rate value. At step 608, the displacement of the valve is compared to an expected displacement value. At step 610, the pressure inside an internal chamber of the enclosure for the active applied pressure of the vacuum pump is compared to an expected pressure value for the same applied pressure. At step 612, the time to achieve an expected pressure within the internal chamber for the applied pressure of the vacuum pump is compared to an expected pressure time value for the same applied pressure. The results of each of steps 606, 608, 610, and 612 are collated and considered at step 614. If any of the measured data values deviated from their respective expected counterparts by a degree larger than a threshold value specified for each comparison, that comparison is considered to be unsuccessful, indicating a potential leak. If all of the comparisons are found to be within the specified operating parameters, the method proceeds to step 616, where a seal indication is generated and output to a user, indicating that no leak was detected. If any of the comparisons are found to be unsuccessful at step 614, the method instead proceeds to step 618, where a leak indication signal is generated and output indicating that a leak has been detected.

In the depicted embodiment, the comparisons of steps 606, 608, 610, and 612 are compared concurrently, but these comparisons may be performed in any sequential order without deviating from the teachings disclosed within. By way of example, and not limitation, an alternative embodiment could sequentially perform steps 606, 608, 610 and 612 in that order. If the comparison is found to be unsuccessful at any given step, the method could immediately proceed to 618, rather than waiting for any other comparison to be performed. This arrangement may advantageously minimize the amount of time to perform the method of FIG. 6 in instances when a leak is detected. In such embodiments, step 614 may be omitted without deviating from the teachings disclosed herein.

The respective steps 606, 608, 610, and 612 may be applied in any combination of sequential and concurrent operation without deviating from the teachings disclosed herein. By way of example, and not limitation, the method may sequentially perform the comparisons of step 606 and step 608, then in a final operation of the comparison sequences perform steps 610 and 612 concurrently. Other embodiments may comprise other combinations without deviating from the teachings disclosed herein.

In some embodiments, one or more of steps 606, 608, 610 and 612 may be omitted without deviating from the teachings disclosed herein. By way of example, and not limitation, a version of the method of FIG. 6 that omits steps 608, 610, and 612 would be functionally very similar to the method of FIG. 3. Any such combination of the steps of 606, 608, 610 and 612 may be selectively combined by a user performing the tests with a dedicated device, such as tester 107 (see FIG. 1; FIG. 2). By way of example, and not limitation, a user subjecting an enclosure having no valves exhibiting displacement may selectively omit step 608 from the method in order to save time in the leak detection without deviating from the teachings disclosed herein. In some embodiments, a dedicated testing device, such as tester 107, may have stored in a memory (such as memory 112; see FIG. 1) pre-set leak detection methodologies that are found to be suitable with known configurations of enclosures.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A method of leak detection for an automotive battery enclosure having a seal, an internal chamber, and a plurality of ports in fluid communication with the internal chamber including a first port with a valve, wherein the method comprises:
    applying a vacuum pump having a mass airflow sensor to a first port;
    sealing the other ports of the plurality of ports;
    activating the vacuum pump to apply a predetermined fixed vacuum pressure to the internal chamber;
    generating, with the mass airflow sensor, mass exchange rate data indicating a rate of mass exchange within the enclosure;
    generating, with the mass airflow sensor, mass exchange rate data indicating a rate of data indicating a pressure within the internal chamber;
    measuring the displacement of the valve while the vacuum pump is activated; and
    outputting a leak indication signal indicating that at least one leak in the seal is present when the mass exchange rate data indicates that the rate of mass exchange is greater than an expected threshold rate value or when the measured displacement of the valve deviates from an expected displacement value by an amount greater than an expected threshold displacement value,
    wherein
    the seal of the enclosure is suitable to prevent an exchange of liquid material and permit an exchange of gaseous material.

2. The method of claim 1, wherein the automotive battery enclosure has two ports.

3. The method of claim 1, further comprising the comprising the steps of:
    increasing the pressure applied by the vacuum pump after activation until the mass airflow sensor indicates a predetermined pressure value;
    measuring a time datum indicating how long from the activation of the vacuum pump it takes for the internal chamber to reach the predetermined pressure value; and
    outputting the leak indication signal indicating that at least one leak in the seal is present when the time datum is greater than an expected threshold time value.

4. The method of claim 3, further comprising the steps of:
    measuring the applied pressure of the vacuum pump when the mass airflow sensor indicates the predetermined pressure value; and
    outputting the leak indication signal indicating at least one leak in the seal is present when the applied pressure of the vacuum pump is greater than an expected threshold pump pressure value.

5. The method of claim 1, further comprising the steps of:
    increasing the pressure applied by the vacuum pump after activation until the mass airflow sensor indicates a predetermined pressure value;
    measuring the applied pressure of the vacuum pump when the mass airflow sensor indicates the predetermined pressure value; and
    outputting the leak indication signal indicating at least one leak in the seal is present when the applied pressure of the vacuum pump is greater than an expected threshold pump pressure value.

6. The method of claim 1, wherein sealing the other ports of the plurality of ports comprises an airtight seal.

7. The method of claim 1, wherein the sealing the other ports of the plurality of ports comprises utilizing a rubber stopper.

8. A method of leak detection for an automotive battery enclosure having a seal, an internal chamber, and a plurality of ports including a first port with a valve, the first port being in fluid communication with the internal chamber, wherein the method comprises:
    applying a vacuum pump having a mass airflow sensor to the first port;
    sealing the other ports of the plurality of ports;
    activating the vacuum pump to apply a predetermined fixed vacuum pressure to the internal chamber;
    generating, with the mass airflow sensor while the vacuum pump is activated, pressure data indicating a pressure within the internal chamber;
    measuring the displacement of the valve while the vacuum pump is activated;
    outputting a leak indication signal indicating that at least one leak in the seal is present when the measured displacement of the valve deviates from an expected displacement value by an amount greater than an expected threshold displacement value,
    wherein the seal of the enclosure is suitable to prevent an exchange of liquid material and permit an exchange of gaseous material.

9. The method of claim 8, further comprising the steps of:
increasing the pressure applied by the vacuum pump after activation until the mass airflow sensor indicates a predetermined pressure value;
measuring a time datum indicating how long from the activation of the vacuum pump it takes for the internal chamber to reach the predetermined pressure value; and
outputting the leak indication signal indicating that at least one leak in the seal is present when the time datum is greater than an expected threshold time value.

10. The method of claim 9, further comprising the steps of:
measuring the applied pressure of the vacuum pump when the mass airflow sensor indicates the predetermined pressure value; and
outputting the leak indication signal indicating at least one leak in the seal is present when the applied pressure of the vacuum pump is greater than an expected threshold pump pressure value.

11. The method of claim 8, further comprising the steps of:
measuring the applied pressure of the vacuum pump when the mass airflow sensor indicates the predetermined pressure value; and
outputting the leak indication signal indicating at least one leak in the seal is present when the applied pressure of the vacuum pump is greater than an expected threshold pump pressure value.

12. The method of claim 8, wherein the plurality of ports consists of two ports.

13. The method of claim 8, wherein sealing the other ports of the plurality of ports comprises an airtight seal.

14. The method of claim 8, wherein sealing the other ports of the plurality of ports comprises utilizing a rubber stopper.

15. A method of leak detection for an automotive battery enclosure having a seal, an internal chamber, and a plurality of ports including a first port with a valve, the plurality of ports being in fluid communication with the internal chamber, wherein the method comprises:
applying a vacuum pump having a mass airflow sensor to the first port;
sealing the other ports of the plurality of ports;
activating the vacuum pump to apply a predetermined fixed vacuum pressure to the internal chamber;
generating, with the mass airflow sensor while the vacuum pump is activated, pressure data indicating a pressure within the internal chamber;
generating, with the mass airflow sensor while the vacuum pump is activated, mass exchange rate data indicating a rate of mass exchange within the enclosure;
increasing the pressure applied by the vacuum pump after activation until the mass airflow sensor indicates a predetermined pressure value;
measuring a time datum indicating how long from the activation of the vacuum pump it takes for the internal chamber to reach the predetermined pressure value;
measuring the displacement of the valve while the vacuum pump is activated;
measuring the applied pressure of the vacuum pump when the mass airflow sensor indicates the predetermined pressure value; and
outputting a leak indication signal indicating at least one leak in the seal is present when the time datum is greater than an expected threshold time value, the applied pressure of the vacuum pump is greater than an expected threshold pump pressure value, when the mass exchange rate data indicates that the rate of mass exchange is greater than an expected threshold rate value, or the measured displacement of the valve deviates from an expected displacement value by an amount greater than an expected threshold displacement value.

16. The method of claim 15, wherein the plurality of ports consists of two ports.

17. The method of claim 15, wherein sealing the other ports of the plurality of ports comprises an airtight seal.

18. The method of claim 15, wherein sealing the other ports of the plurality of ports comprises utilizing a rubber stopper.

* * * * *